(12) United States Patent
Zhu et al.

(10) Patent No.: US 9,298,525 B2
(45) Date of Patent: Mar. 29, 2016

(54) ADAPTIVE FAULT DIAGNOSIS

(71) Applicant: Accenture Global Services Limited, Dublin (IE)

(72) Inventors: Qian Zhu, Mountain View, CA (US); Teresa Tung, San Jose, CA (US); Qing Xie, San Jose, CA (US)

(73) Assignee: Accenture Global Services Limited, Dublin (IE)

( * ) Notice: Subject to any disclaimer, the term of this patent is extended or adjusted under 35 U.S.C. 154(b) by 558 days.

(21) Appl. No.: 13/772,135

(22) Filed: Feb. 20, 2013

(65) Prior Publication Data

US 2014/0172371 A1 Jun. 19, 2014

Related U.S. Application Data

(60) Provisional application No. 61/733,047, filed on Dec. 4, 2012.

(51) Int. Cl.
*G06F 11/00* (2006.01)
*G06F 11/07* (2006.01)
*G06Q 10/00* (2012.01)

(52) U.S. Cl.
CPC .......... *G06F 11/0709* (2013.01); *G06F 11/079* (2013.01); *G06Q 10/00* (2013.01)

(58) Field of Classification Search
CPC ... G06F 11/0709; G06F 11/079; G06Q 10/00; H04L 41/0677; H04L 41/147
USPC .............. 702/183, 184, 185; 709/223; 714/43
See application file for complete search history.

(56) References Cited

U.S. PATENT DOCUMENTS

2008/0140817 A1* 6/2008 Agarwal ............ H04L 41/0677
709/223

OTHER PUBLICATIONS

"Patent Examination Report No. 2" on Australia Patent Application No. 2014200806, IP Australia, dated Aug. 19, 2014, 4 pages.
"Patent Examination Report No. 3" on Australia Patent Application No. 2014200806, IP Australia, dated Dec. 8, 2014, 3 pages.
Bhaduri, Kanishka, et al., "Detecting Abnormal Machine Characteristics in Cloud Infrastructures", May 2011.
Bronevetsky, G., et al., "Automatic Fault Characterization via Abnormality-Enhanced Classification", Conference on Dependable Systems and Networks, Honk Kong, China, Dec. 20, 2010.

(Continued)

*Primary Examiner* — John H Le
(74) *Attorney, Agent, or Firm* — Mannava & Kang, P.C.

(57) ABSTRACT

According to an example, an adaptive fault diagnosis system may include a memory storing machine readable instructions to receive metrics and events from an enterprise system, and use a substitution graph to determine if a received metric or a received event belongs to a cluster that includes one or more correlated metrics and/or events grouped based on similarity. If the received metric or the received event belongs to the cluster, the memory may further store machine readable instructions to use a detection graph to determine if the received metric or the received event is identifiable to form a fault pattern by traversing a fault path of the detection graph. Further, the memory may further store machine readable instructions to diagnose a fault based on the traversal of the fault path of the detection graph. The system may include a processor to implement the machine readable instructions.

20 Claims, 10 Drawing Sheets

(56) References Cited

OTHER PUBLICATIONS

Cherkasova, Ludmila, et al., "Anomaly? Application Change? or Workload Change? Towards Automated Detection of Application Performance Anomaly and Change", HPLabs, College of William and Mary, Jun. 2008.

Cinque, Marcello, et al., "Assessing and Improving the Effectiveness of Logs for the Analysis of Software Faults", 2010 IEEE/IFIP International Conference on Dependable Systems & Networks (DSN), Jun. 2010.

Cohen, Ira, et al., "Capturing, Indexing, Clustering, and Retrieving System History", Hewlett-Packard Laboratories, Compuer Science Department-Standford University, Dec. 2005.

Kavulya, Soila, P., et al., "Draco: Statistical Diagnosis of Chronic Problems in Large Distributed Systems", Carnegie Mellon University, AT&T Labs-Research, Jun. 2012.

Duan, Songyun, et al., "Guided Problem Diagnosis through Active Learning", International Conference on Automonic Computing, Duke University, Jun. 2008.

Yuan, Chun, et al., "Automated Known Problem Diagnosis with Event Traces", Microsoft Research Asia, Tsinghua University, University of Science and Technology of China, Microsoft Research, Apr. 2006.

Bodik, Peter, et al., "Fingerprinting the Datacenter: Automated Classification of Performance Crises", Microsoft Research, Microsoft, Apr. 2010.

Yemini, Shaula Alexander, et al., "High Speed and Robust Event Correlation", SMARTS, May 1996.

Jiang, Miao, et al., "Dependency-aware Fault Diagnosis with Metric-Correlation Models in Enterprise Software Systems", Shoshin Distributed Systems Group, Oct. 2010.

Jiang, Miao, et al., "Efficient Fault Detection and Diagnosis in Complex Software Systems with Information-Theoretic Monitoring", IEEE Transactions on Dependable and Secure Computing, vol. 8, No. 4, Aug. 2011.

Jiang, Guofei, et al., "Modeling and Tracking of Transaction Flow Dynamics for Fault Detection in Complex Systems", IEEE Transactions on Dependable and Secure Computing, vol. 3. No. 4, Oct. 2006.

Barham, Paul, et al., "Using Magpie for request extraction and workload modelling", Microsoft Research, Dec. 2004.

Chen, Mike Y., et al., "Path-Based Failure and Evolution Management", UC Berkeley, Tellme Networks, Standford University, eBay Inc., Mar. 2004.

Pertet, Soila, et al., "Fingerpointing Correlated Failures in Replicated Systems", Carnegie Mellon University, Oct. 2007.

Shan, Hanhuai, et al., "Extracting Overlay Invariants of Distributed Systems for Autonomic System Management", 2010 Fourth IEEE International Conference on Self-Adaptive and Self-Organizing Systems, Oct. 2010.

Strehl, Alexander, et al., "Cluster Ensembles { A Knowledge Reuse Framework for Combining Multiple Partitions", Journal of Machine Learning Research 3 (2002) 583-617, Dec. 2002.

Xu, Wei, et al., "Detecting Large-Scale System Problems by Mining Console Logs", EECS Department, Intel Labs Berkeley, Oct. 2009.

"Patent Examination Report No. 1" on Australia Patent Application No. 2014200806, IP Australia, dated Apr. 14, 2014, 5 pages.

\* cited by examiner

120

|    | m1   | m2    | m3     | m4     | e1    | e2    | e3    |
|----|------|-------|--------|--------|-------|-------|-------|
| m1 | 1    | 0.96  | 0      | 0.008  | 0.59  | 0.73  | 0.02  |
| m2 | 0.96 | 1     | 0.003  | 0.09   | 0.86  | 0.001 | 0.006 |
| m3 | 0    | 0.003 | 1      | 0.0006 | 0     | 0.001 | 0.002 |
| m4 | 0.008| 0.09  | 0.0006 | 1      | 0.08  | 0.03  | 0.82  |
| e1 | 0.59 | 0.86  | 0      | 0.08   | 1     | 0.68  | 0.006 |
| e2 | 0.73 | 0.9   | 0.001  | 0.03   | 0.68  | 1     | 0.008 |
| e3 | 0.02 | 0.006 | 0.002  | 0.82   | 0.006 | 0.008 | 1     |

Fig. 4

| EDGERANK Factors | Definition |
|---|---|
| Affinity ($U_e$) | Involvement of a metric/event |
| Weight ($W_e$) | Discriminative power of a metric/event |
| Time Decay ($D_e$) | How recent the metric/event-to-fault edge is |

ADAPTIVE FAULT DIAGNOSIS

CROSS-REFERENCE TO RELATED APPLICATION(S)

This application claims the benefit of provisional patent application U.S. Ser. No. 61/733,047, filed Dec. 4, 2012, which is expressly incorporated herein by reference.

BACKGROUND

Software systems may be subject to partial failure, violation of an established service-level agreement (SLA), or unexpected response to workload. Recovery from such failures, violations, or unexpected responses can include, for example, rebooting a system, or further expert analysis if rebooting is insufficient. For example, in order to determine the cause of a failure, an expert may need to manually evaluate a series of events to track down the cause of the failure. Once the cause of the failure is detected, a recovery mechanism may be applied to correct the failure. These processes can be time-consuming and complex, for example, based on the complexities of the software, the cause of the failure, and the complexities of the recovery mechanism.

SUMMARY OF THE INVENTION

A system and method for adaptive fault diagnosis as described herein.

BRIEF DESCRIPTION OF DRAWINGS

Features of the present disclosure are illustrated by way of examples shown in the following figures. In the following figures, like numerals indicate like elements, in which:

FIG. 4 illustrates a similarity matrix, according to an example of the present disclosure;

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Enterprise systems may include a variety of components including hardware, virtual machines, software, and various configurations. Enterprise systems may use cloud computing to gain flexibility and efficiency. Cloud based enterprise systems may include unreliability, for example, due to the unreliability in various cloud resources that are used. For example, cloud resources can often be under the control of different service providers, each with different reliability constraints. In order to maintain high operational reliability and availability in enterprise systems, manual processes or other techniques can be used to detect faults and provide remediation measures. For example, referring to FIG. 2, an architecture of an enterprise system may include multiple tiers that run across multiple sites. For example, an enterprise system may include an application tier, a message queue (MQ) middleware layer, and a database tier. The application tier may handle all application operations between users and an organization's backend business. The MQ layer may direct user requests to different sites based, for example, on request type and resource availability. The back-end database tier may be used for persistent data storage. Each tier of the enterprise system may be built by a number of software packages providing similar functionality. For the example of FIG. 2, an ABC server may be used as the application tier server, ABC MQ may be used as the message queues, and a structured query language (SQL) database may be used as the database.

Figure 2:
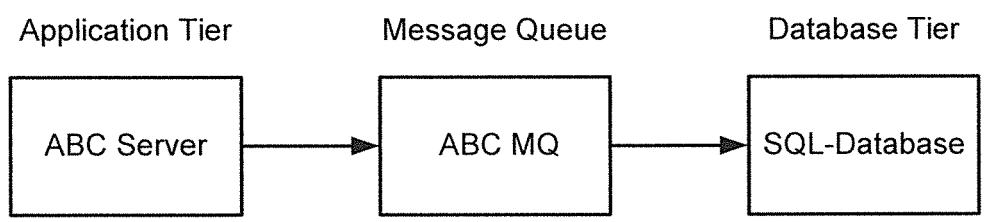
FIG. 2 illustrates a three-tier layout of an enterprise system, according to an example of the present disclosure.
Figure 3:
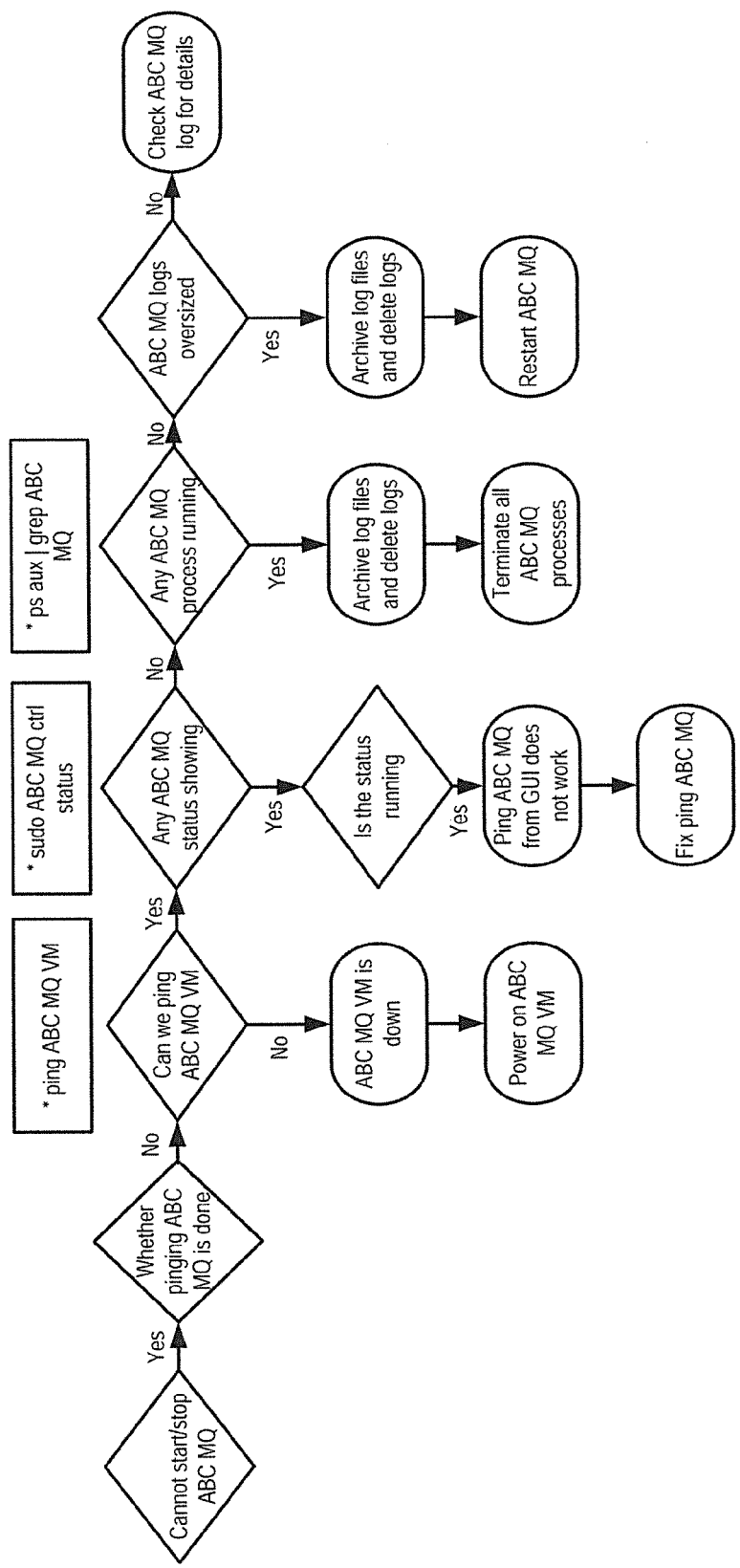
FIG. 3 illustrates a faulty scenario where a system does not respond to user requests, according to an example of the present disclosure.

FIG. 3 illustrates an example of a faulty scenario for an online retail store system using the enterprise system architecture of FIG. 2, where the online retail store system does not respond to user requests. Examples of steps for identifying and correcting a fault are shown in FIG. 3. For example, based on various fault scenarios related to whether ABC MQ is down, an expert may power on an ABC MQ virtual machine (VM), fix ping ABC MQ, terminate all obsolete ABC MQ processes, or restart ABC MQ. Such manual fault identification and correction can be time-consuming and complex based, for example, on the complexities of the ABC MQ, the cause of the failure, the complexities of any recovery mechanism that is applied, and dependencies among tiers/servers (e.g., the database server cannot start until the message queue is up and running) which can be difficult for an expert to memorize.

Faults may be automatically detected, for example, by using alerts that are triggered on set thresholds determined based on a running instance or on past administrator experience. Also, faults may be automatically detected by using signatures to represent system states, for example, for an enterprise system. A signature of an enterprise system may include a vector of selective monitoring metrics, such as, for example, central processing unit (CPU) usage of a database server, with each metric being set with a threshold. However, the use of signatures relies on characteristics of the environment or applications, and is therefore specific to faulty instances (e.g., running in specific environments and workloads).

According to an example, an adaptive fault diagnosis system and a method for adaptive fault diagnosis are disclosed herein. The adaptive fault diagnosis system may include a memory storing machine readable instructions to receive metrics and events from an enterprise system, and use a substitution graph to determine if a received metric or a received event belongs to a cluster that includes one or more correlated metrics and/or events grouped based on similarity. For example, similarity may include the following relationships: event-event, where event A and event B appear together with a fixed order; metric-metric, where metric A is a function of metric B; and metric-event, where event A occurs after metric B reaches a threshold, or event A includes metric B. If the received metric or the received event belongs to the cluster, the memory may further store machine readable instructions to use a detection graph to determine if the received metric or the received event is identifiable to form a fault pattern by traversing a fault path of the detection graph. Further, the memory may further store machine readable instructions to diagnose a fault based on the traversal of the fault path of the detection graph. The system may include a processor to implement the machine readable instructions.

The adaptive fault diagnosis system and the method for adaptive fault diagnosis disclosed herein may generally use monitoring information that includes metrics and events that are collected, for example, from physical servers, virtualized clusters, virtual machines, operating systems and network statistics, as well as events from software log files. According to an example, a performance metric may be a resource usage value (e.g., CPU system usage of 80%), which may be sampled at a predetermined monitoring frequency. Each metric may be associated with a time tag representing the time it is measured. According to an example, an event may be an activity related, for example, to a virtual machine, operating system, servers, etc., (e.g., the ABC server of FIG. 2 being connected to port 12333). For example, events may be extracted from the server logs. The system and method disclosed herein may automate the fault detection process by capturing a subset of the collected metrics and log events that discriminate among fault and non-fault cases, for example, in both private data centers (e.g., private enterprise systems) and public clouds (e.g., cloud-based enterprise systems). For example, the system and method disclosed herein may monitor a subset of metrics and events from an enterprise system based on previously detected fault patterns. For example, fault patterns may refer to a collection of metrics and events ordered on their time tags. For public clouds, workloads running on the same servers may be a source of unpredictably interference, and monitoring information may be limited. Therefore, the system and method disclosed herein may provide a generic and adaptive framework such that detected fault patterns are not specific to any environment, application, or faulty instance. If a fault is known, the system and method disclosed herein may identify the root cause of the fault, and thus provide for the application of an appropriate remedy. Further, the system and method disclosed herein may also determine that a fault does not correspond to any previously seen incident. In such cases, the system and method disclosed herein may ascertain the needed information to prioritize or escalate diagnosis and repair efforts. Thus, the system and method disclosed herein may accelerate diagnosis and resolution steps, and record results in case the same faults occur again. The system and method disclosed herein may also be adaptable across different application workloads. The system and method disclosed herein may also be adaptable to the cloud environment where variations in the underlying environments are part of multi-tenancy, and capture faults that are variants from known patterns with minor changes.

The adaptive fault diagnosis system and the method for adaptive fault diagnosis disclosed herein may automatically select and identify metrics and events from monitoring and log information to generate fault patterns. The system and method disclosed herein may represent the hierarchy of relationships between metrics and events for detection and identification of faults, for example, by generating the substitution graph and the detection graph. The substitution graph may represent correlations among events and metrics. The detection graph may represent faults based on paths of events and metrics. For example, for the substitution graph, correlated events and/or metrics may be grouped based on their similarity into clusters, so that one (i.e., an event and/or a metric) can be substituted for the other if both are in the same cluster to remove redundant information. For the detection graph, the relationship from metrics and events to faults may be mapped such that most critical metrics and events may be identified to form a fault pattern. The system and method disclosed herein may select key indicators (i.e., key events and metrics) for a fault pattern, for example, by using an EDGERANK algorithm. The fault pattern may be used as a template to infer a fault with high confidence even though the monitored events and metrics may not be an exact match with a previous (i.e., known) fault pattern but are correlated from the substitution graph. Thus, the system and method disclosed herein may operate across different instances to detect potential faults. For example, for the system and method disclosed herein, a captured fault pattern may not be specific to a particular instance of a use case, configuration, or environment, and instead may be applied across instances. The system and method disclosed herein may also adapt to unpredictable interference and potentially unavailable monitoring information to facilitate application in a cloud environment. Thus the system and method disclosed herein may be applied across deployments, and may be used with private settings and/or public cloud settings.

The adaptive fault diagnosis system and the method for adaptive fault diagnosis disclosed herein generally provide a fault diagnosis framework with a detection process that is not specific to a running instance, and is therefore adaptable to different environments. Based, for example, on the representation of hierarchical relationships between metrics, events, and faults, the system and method disclosed herein provide a template for fault pattern identification which captures faults that cover variants of previously detected faults with minor changes, i.e., metrics and events may be replaced by correlated metrics and events from the same cluster, or where thresholds for a metric may be tuned based on a ratio trained from measuring metric values from different environments.

The adaptive fault diagnosis system and the method for adaptive fault diagnosis disclosed herein provide a technical solution to the technical problem of manual evaluation of metrics and/or events to determine the cause of a failure (i.e., diagnose a fault). In many instances, manual evaluation of metrics and/or events to determine the cause of a failure is not a viable solution given the heterogeneity and complexities associated with software, the cause of a failure, and the complexities of a recovery mechanism. The system and method described herein provide the technical solution of automatic fault diagnosis by receiving metrics and events from an enterprise system, and using a substitution graph to determine if a received metric or a received event belongs to a cluster that includes one or more correlated metrics and/or events grouped based on similarity. If the received metric or the received event belongs to the cluster, a detection graph may be used to determine if the received metric or the received event is identifiable to form a fault pattern by traversing a fault path of the detection graph. A fault may be diagnosed based on the traversal of the fault path of the detection graph. The substitution graph may be generated by collecting metrics and events created by injection of a plurality of labeled faults in a training enterprise system, and using the collected metrics and events to generate the substitution graph to group one or more collected metrics and/or one or more collected events into a plurality of clusters such that the one or more collected metrics and/or events grouped in one cluster are more strongly related to the one or more collected metrics and/or events grouped in the one cluster as compared to the one or more collected metrics and/or events in other clusters. Further, the detection graph may be generated by using the collected metrics and events to generate the detection graph by ordering and connecting one or more collected metrics and/or events based on respective timestamps, ranking the one or more collected metrics and/or events based on contribution to fault identification, and selecting the one or more ranked metrics and/or events critical to a fault to form a fault pattern.

Figure 1:
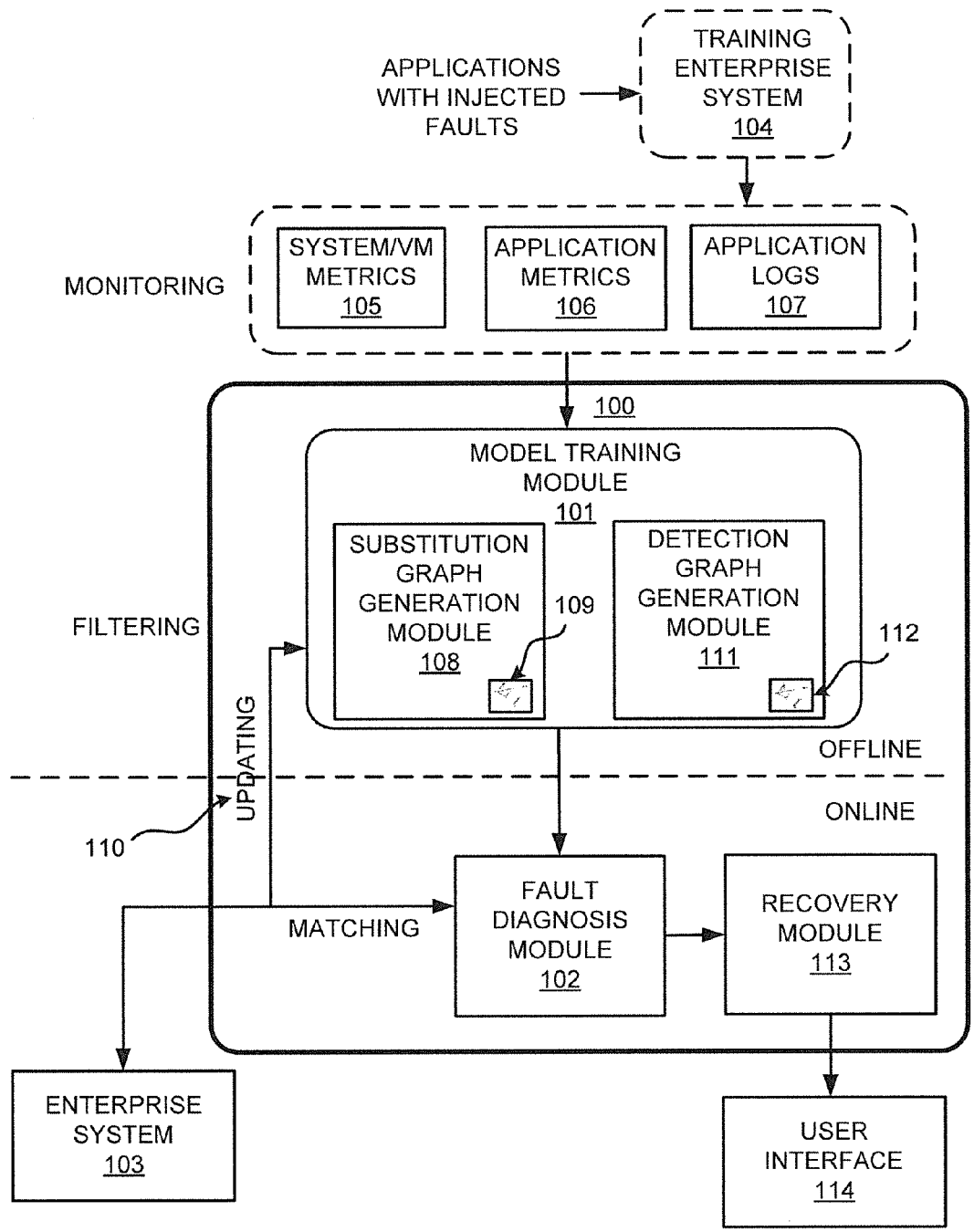
FIG. 1 illustrates an architecture of an adaptive fault diagnosis system, according to an example of the present disclosure.

FIG. 1 illustrates an architecture of an adaptive fault diagnosis system 100, according to an example. Referring to FIG. 1, the system 100 is depicted as including an model training module 101 to perform fault detection training. The model training module 101 may perform fault detection training in an offline mode of the system 100. A fault diagnosis module 102 may utilize the fault detection training performed by the model training module 101 to diagnose faults in an enterprise system 103. The enterprise system 103 may be a private enterprise system, or a public cloud based enterprise system. In order to perform fault detection training, applications with injected labeled faults may be used with a training enterprise system 104, or unknown faults may be labeled after they are observed. The training enterprise system 104 may be a private enterprise system. The injection of the labeled faults may result in the creation of monitoring data. The monitoring data may include metrics and events related data. For example, the monitoring data may include system and VM metrics 105 related to the performance of physical and virtual components of the training enterprise system 104, and application software components of the training enterprise system 104 such as application metrics 106, and application logs 107 (i.e., application log events). A substitution graph generation module 108 of the model training module 101 may use the monitoring data to generate a substitution graph 109 to group one or more metrics and/or one or more events into a plurality of clusters such that the one or more metrics and/or events grouped in one cluster are more strongly related to the one or more metrics and/or events grouped in the one cluster as compared to the one or more metrics and/or events in other clusters. Based on the grouping, the add-on value of choosing a metric or event from a cluster may be minimized if a metric or event from the same cluster has already been chosen. This identification of clusters may facilitate reduction of redundant information and may thus focus on the monitoring of key information related to an enterprise system. The identification may also isolate non-workload or environment dependent metrics or events that may work across instances without adjustment. In order to identify clusters, as discussed in further detail below, a similarity measure, such as, for example, normalized mutual information (NMI) may be used. Since the correlation between metrics and/or events may exist with certain user behaviors and use cases, a score may be used to determine cluster robustness (i.e., how consistent a cluster is against multiple use cases and different environments). For example, each cluster may be scored based on how one or more metrics and/or events in the scored cluster originated. New (i.e., never encountered before) user requests may be used to update, as shown at 110, the substitution graph in an continuous manner. A detection graph generation module ill may generate a detection graph 112 by ordering and connecting one or more metrics and/or events based on respective timestamps, ranking the one or more collected metrics and/or events based on contribution to fault identification, and selecting the one or more ranked metrics and/or events critical to a fault to form a fault pattern. Not every metric or event may be considered equally important with respect to identifying a fault. Accordingly, the metrics or events that are most critical to a particular fault may be selected, for example, by using an EDGERANK algorithm, and may be therefore included as part of a fault pattern formation. The fault pattern may be utilized as a template such that faults that differ from the template may also be diagnosed. Selected metrics and events may be ranked based, for example, on criticality such that the metric or event most critical to fault identification may be assigned the highest score. Thus, the fault pattern may be utilized as a template to diagnose a new fault that includes different events and/or different metrics compared to events and/or metrics of a known fault pattern. The fault diagnosis module 102 may diagnose faults in the enterprise system 103 by monitoring the enterprise system 103 for metrics and events, checking the occurrence of a metric and/or an event against the substitution graph 109, and traversing an appropriate fault path along the detection graph 112 to diagnose the occurrence of a fault. If the enterprise system 103 experiences unknown user behaviors which may result in a false alarm (i.e., a false fault diagnosis), the fault patterns and associated substitution and detection graphs may be updated, as shown at 110, accordingly. A recovery module 113 may generate one or more remediation measures to address faults diagnosed by the fault diagnosis module 102. The recovery module 113 may output the remediation measures using a user interface 114.

The modules and other components of the system 100 that perform various other functions in the system 100, may comprise machine readable instructions stored on a non-transitory computer readable medium. In addition, or alternatively, the modules and other components of the system 100 may comprise hardware or a combination of machine readable instructions and hardware.

With continued reference to FIG. 1, the substitution graph generation module 108 may use the monitoring data to generate the substitution graph 109 to group one or more metrics and/or one or more events into a plurality of clusters such that the one or more metrics and/or events grouped in one cluster are more strongly related to the one or more metrics and/or events grouped in the one cluster as compared to the one or more metrics and/or events in other clusters. The substitution graph 109 may be based on a premise that certain metrics and/or events are correlated. For example, metrics A and B may be considered correlated if metric A is a function of metric B. Similarly, events A and B may be considered correlated if event A and event B always appear simultaneously. Similarly, event A and metric B may be considered correlated if event A occurs after metric B reaches a threshold, or if event A includes metric B. Thus, if metrics and/or events are correlated, it can be indicated with high confidence that a pattern with one of the detected metrics and/or events can lead to a fault. Such correlations may be represented as a link between metrics and/or events in the substitution graph 109 with a weight assigned to the metrics and events based on their similarity to other metrics and events in a cluster. The substitution graph 109 may be constructed such that if a metric is already chosen to relate to a fault, choosing any other correlated metrics may not provide additional information with respect to detecting the fault. Further, the substitution graph 109 may be constructed such that if a metric or event is on the path of a known fault but somehow remains normal while an abnormal value of its correlated metric registers, that condition (i.e., the abnormal value of the correlated metric) may indicate a fault with a high probability.

In order to construct the substitution graph 109, a similarity between metrics and/or events may be defined. Based on the similarity measurement, metrics and/or events may be clustered such that strongly correlated metrics and events appear within a cluster. As user behavior and environmental conditions vary, such clusters may evolve (i.e., appear or disappear in different scenarios). Thus, each cluster may be assigned a score to represent how consistently the correlations hold as behavior of the training enterprise system 104 varies, with the score being referred to as the consistency score.

For the substitution graph 109, a similarity matrix may be generated and used to categorize the linear or non-linear relationships between metrics and events, for example, as event-event, metric-metric, or metric-event correlations. If event A and B appear together with a fixed order, such correlation may be designated as event-event correlation. If metric A is a function of metric B, such correlation may be designated as metric-metric correlation. If event A occurs after metric B reaches a threshold, or if event A includes metric B, such correlation may be designated as metric-event correlation. The event-event, metric-metric, or metric-event correlations may be considered transitive in that if metric A is correlated with metric B, and metric A is also correlated with event C, then metric B may be designated as being correlated with event C. For event-event and metric-event correlations, processes, such as, for example, association rule mining may be used to determine event-event and metric-event correlations. Metrics and events from rules with a confidence support lower than a threshold may be discarded. The confidence support of remaining rules may be referred to as the similarity between events and metrics. For example, the association rule mining may locate all the rules such as metric A→metric B (e.g., rule#1) or metric A→event B (e.g., rule#2). For example, assuming there are 100 rules where metric A→metric/event X, the confidence support for rule#1 may include a percentage of the number of rule#1 out of 100. For example, 10 instances of rule#1 may include a confidence support of 0.1. Further, consider the confidence support for rule#2 is 0.3. If a threshold (e.g., 0.2) is used to determine whether a rule is popular, then rule#1 may be discarded and rule#2 may be retained. Therefore, metric A and event B may be considered to be strongly correlated.

In order to determine event-event, metric-metric, or event-metric correlation, considering two random variables X and Y, the conditional entropy H(Y|X) may measure the uncertainty of variable Y given another variable X. The conditional entropy H(Y|X) may represent the remaining uncertainty of Y knowing values taken by X. The conditional entropy H(Y|X) may be defined as follows:

$$H(Y|X) = -\sum_{i=1}^{n}\sum_{j=1}^{m} p(x_i, y_j) \log p(y_j | x_i) \qquad \text{Equation (1)}$$

For Equation (1) where X and Y represent two random variables, X and Y may be considered as metrics and/or events. The mutual information (MI) may measure the reduction in uncertainty of a random variable Y given another random variable X. Such reduction may represent the amount of information either variable provides about the other, i.e., how correlated are the variables Y and X. The mutual information (MI) may be represented as follows:

$$I(X,Y) = H(X) - H(Y|X) \qquad \text{Equation (2)}$$

For Equation (2), H(X) may represent the information entropy. Since H(Y|X) is not symmetric, and further, since MI uses absolute values and is therefore not comparable across all metrics, normalization may be used for mutual information. For example, normalized mutual information (NMI) may be used to represent the level of similarity between two variables. For variable X and Y, NMI may be defined as follows:

$$NMI(X,Y) = \frac{I(X,Y)}{\sqrt{H(X)H(Y)}} \qquad \text{Equation (3)}$$

Generally, the NMI may directly correspond to correlation of two variables. For example, the more correlated two variables are, the higher NMI they have. Computing the NMI value of two metrics may require sampled values. Metric values may be periodically collected during a fault-free period. The collected n samples may be divided into k bins where $n_i$ is the number of samples in the $i^{th}$ bin. Equation (3) may be used to calculate the pair-wise NMI value. A similarity matrix may be constructed based on the NMI values.

Referring to FIGS. 1 and 4, FIG. 4 illustrates a similarity matrix 120, according to an example of the present disclosure. The similarity matrix 120 may include metrics $m_1$, $m_2$, $m_3$, and $m_4$, and events $e_1$, $e_2$, and $e_3$. The similarity values, which represent pair-wise NMI values determined using Equation (3), may be between 0 and 1.

Given a similarity matrix, correlated metrics and/or events may be grouped together, for example, by applying a complete link hierarchical agglomerative clustering (HAC) process. The HAC process may take a similarity matrix M as input. The HAC process may treat each metric or event as a single cluster, and successively merge nearest clusters until either the distances between every two clusters exceed a predefined threshold or all metrics and events belong to one cluster.

For the HAC process, due to the dynamics of user behaviors, clusters may appear or disappear. However, certain relationships may remain under various workloads for the training enterprise system 104. Such relationships may be referred to as system invariant relationships. For example, the volume of incoming network packets to a database server may be related to a number of queries. For clusters representing such correlation, a high score may be assigned based on the consistency. In comparison, the correlation between central processing unit (CPU) usage and network input/output may be very strong if the current workload is dominated by network activities. Such a relationship may disappear if a user is copying files over locally. A consistency score for each cluster may be defined as follows:

$$H(C) = -\sum_{i=1}^{k} \frac{n_i}{n} \log \frac{n_i}{n} \qquad \text{Equation (4)}$$

For Equation (4), $n_i$ may represent a number of times of the $i^{th}$ relationship in the cluster, and n may represent a total number of all relationships in the cluster. A value of 0 may indicate the cluster includes system invariants. Therefore, metrics and/or events within a cluster may replace each other. A relationship pair with a higher consistency score may indicate that such a relationship is more consistent, i.e., it is less likely to break under different scenarios. Thus, relationship pairs with high consistency scores may provide for higher confidence for replacement of one part with another in the pair.

Figure 5:
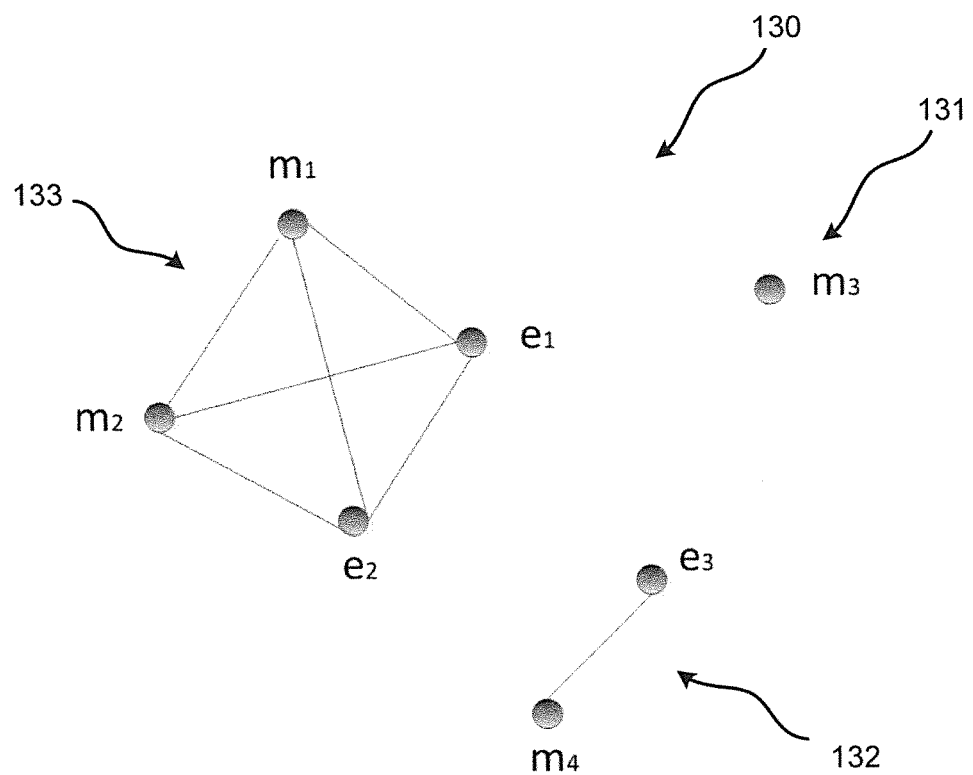
FIG. 5 illustrates a substitution graph with three clusters, according to an example of the present disclosure.

Referring to FIGS. 1, 4 and 5, FIG. 5 illustrates a substitution graph 130, according to an example of the present disclosure. For the substitution graph 130, using the similarity matrix 120 of FIG. 4, metrics and events may be grouped into three clusters 131, 132 and 133, based on the similarity value between each pair. For the example of the substitution graph 130, a similarity value greater than a predetermined threshold of 0.1 may be placed into a cluster. For the substitution graph 130, examples of different types of relationships may include event-event, metric-event, and metric-metric relationships. For example, referring to FIGS. 2, 4, and 5, event-event correlation may include an event X that corresponds to a start of a second ABC server in a same site, and an event Y corresponds to an immediate increase in user response time and then a return to a normal response time. For example, since events X and Y are correlated, every time when the second ABC server starts, there is an increase in the user response time such that the response time crosses a set threshold due to the overhead of adding the new ABC server. For an example of metric-event correlation, a metric X may correspond to a ratio of the size of ABC MQ log files and associated disk space, and an event Y may correspond to the ABC server being in a bad status. For example, since metric X is correlated to event Y, if the size of the ABC MQ log files exceeds 80% disk usage, it may cause the ABC server to become unresponsive to requests. For an example of metric-metric correlation, a metric X may correspond to a number of Hypertext Transfer Protocol (HTTP) requests, and a metric Y may correspond to a number of SQL queries. For example, since metrics X and Y are correlated, if an HTTP request always leads to two SQL queries, then this relationship may be represented as Y=2X.

With continued reference to FIG. 1, the detection graph generation module 111 may generate the detection graph 112 by ordering and connecting one or more metrics and/or events based on respective timestamps, ranking the one or more collected metrics and/or events based on contribution to fault identification, and selecting the one or more ranked metrics and/or events critical to a fault to form a fault pattern. Given all the monitoring information that may relate to a fault, not every metric or event may carry the same weight to trigger a fault. The detection graph 112 may map the relationship from metrics and/or events to faults, and may provide for the identification of the most critical metrics and/or events in forming a fault pattern. Such metrics and events may be respectively referred to as the key metrics and key events. For the detection graph 112, the resulting pattern may be used to distinguish a current fault from normal system scenarios for the training enterprise system 104, as well as from other faults. Moreover, since monitoring information available in a public cloud may be limited, a user may consider ascertaining the key metrics and key events that are most critical to distinguish a fault. Thus for the detection graph 112, each metric and event may be ranked based on their discriminative power with respect to fault detection.

In order to identify the key metrics and events, the detection graph 112 may be constructed to represent the relationships between metrics and events to faults. The relationships between events and metrics may be obtained from the substitution graph 109. For the detection graph 112, all metrics and events that are related to a fault may be connected in a sequence based on their timestamp, i.e., a directed line may be added from event A to event B if event A occurs before event B. The node with only outgoing links may be considered as the metric or event associated with the root cause of the fault. In the detection graph 112, a path may represent a fault. In order to identify the key metrics and events to a fault, the involvement of a metric or event in the fault detection may be categorized, for example, as highly active, active, neutral, or passive. The ratio of the number of occurrences of a metric or event, or a combination of metrics or events in a particular fault may determine which relationship the metric or event share. For example, based on thresholds of 90%, 50% and 30%, the involvement of a metric or event in the fault detection may be categorized as highly active if the involvement exceeds the 90% threshold, active if the involvement is between 90% and 50%, neutral if the involvement is between 50% and 30%, and passive if the involvement is less than 30%. The threshold values may be defined by a user of the adaptive fault diagnosis system 100, and may be adjusted based on different types of enterprise systems. The detection graph 112 may thus provide for the aggregation and characterization of the most important and active information related to faults.

Figure 6:
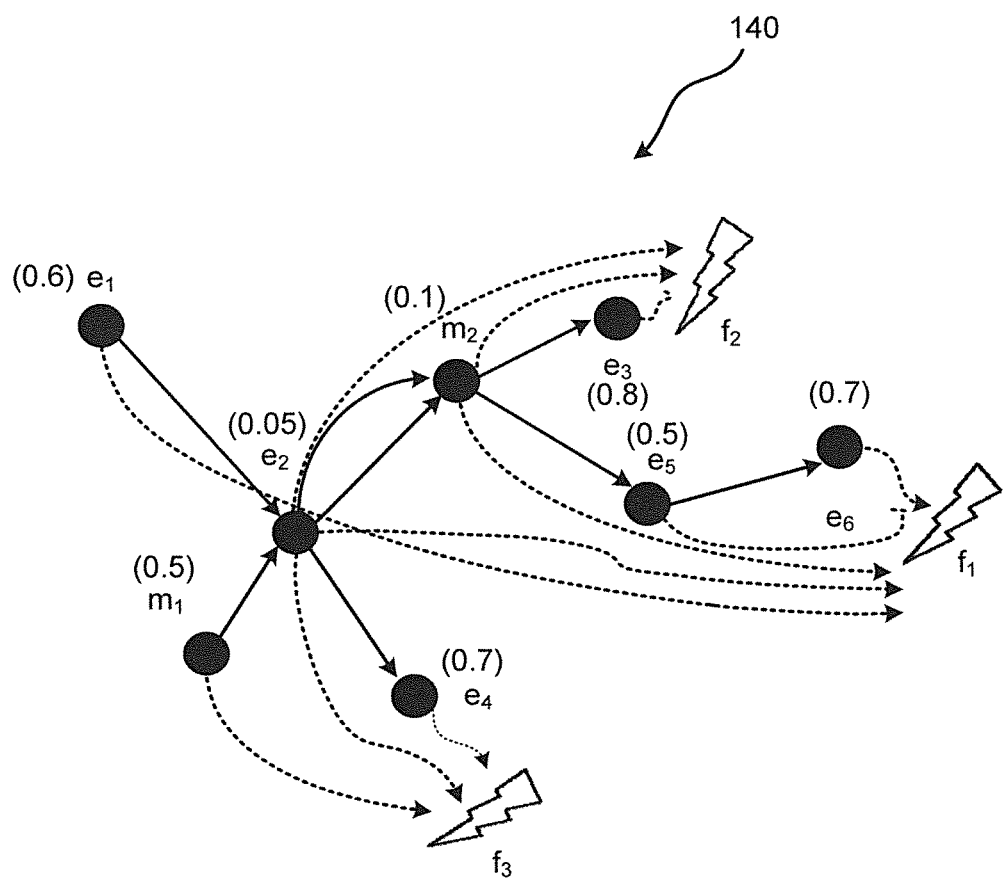
FIG. 6 illustrates a detection graph with three faults, according to an example of the present disclosure.

Referring to FIGS. 1 and 6, FIG. 6 illustrates a detection graph 140 with three faults $f_1$, $f_2$, and $f_3$, according to an example of the present disclosure. For the detection graph 140, solid lines may be used to represent the timely order between metrics (e.g., $m_1$ and $m_2$) and events (e.g., $e_1$, $e_2$, $e_3$, $e_4$, $e_5$, and $e_6$), and dashed lines may represent how involved the metric or event is to a particular fault. For example, the path for fault $f_1$ may begin with an event $e_1$, then include an event $e_2$, then include a metric $m_2$, then include an event $e_5$, and then include an event $e_6$. As shown in FIG. 6, the metric $m_2$ may be highly discriminative to diagnose faults $f_1$ and $f_2$. Events $e_5$ and $e_6$ by themselves may not be discriminative enough to diagnose fault $f_1$, thus the combination of these events $e_5$ and $e_6$ together may strongly indicate a fault $f_1$.

Figures 7, 8:
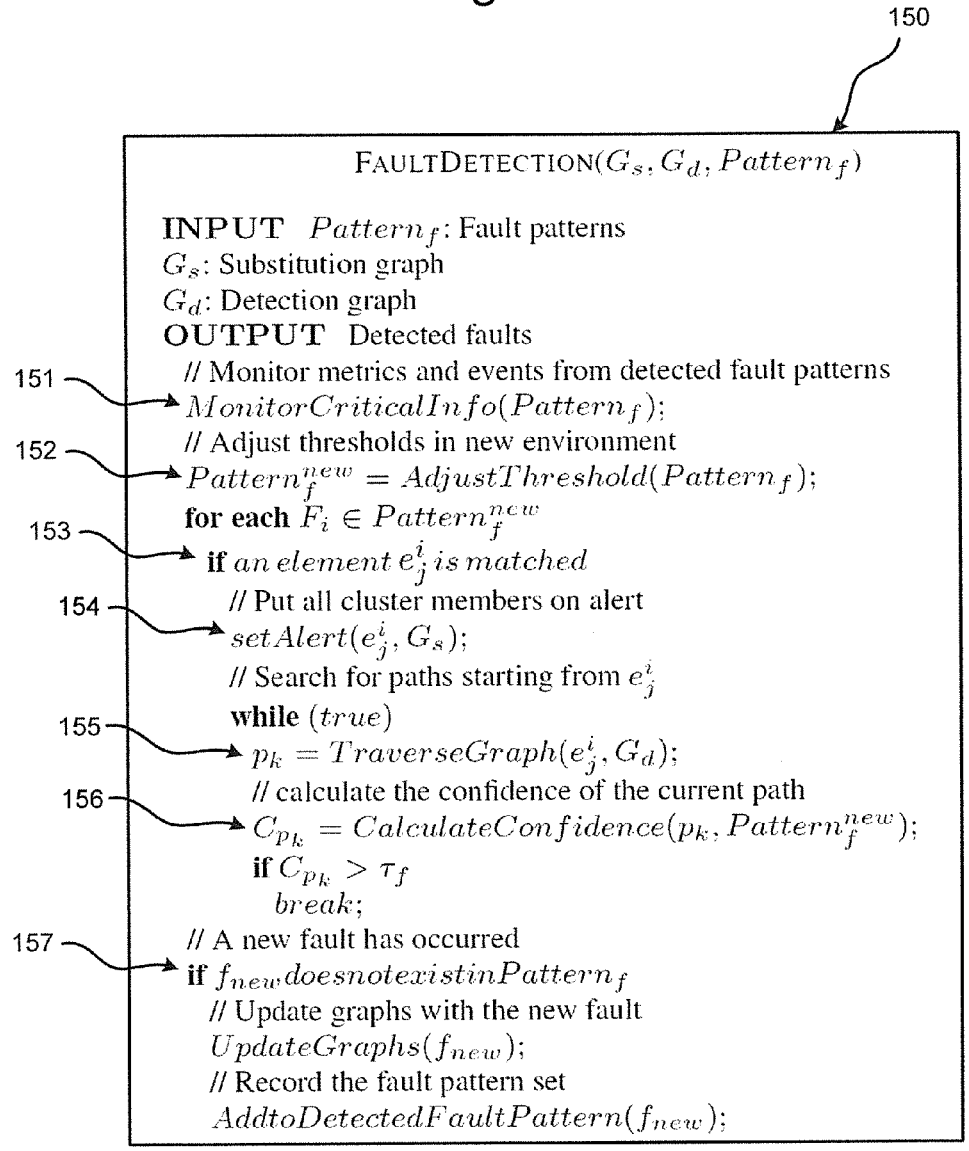
FIG. 7 illustrates edge rank factor definitions, according to an example of the present disclosure.
FIG. 8 illustrates a fault detection process, according to an example of the present disclosure.

Based on the detection graph 112 (e.g., detection graph 140 in the example of FIG. 6), key metrics and events may be identified to form fault patterns. For the example of the detection graph 140 of FIG. 6, intuitively event $e_2$ may not be critical to any fault since event $e_2$ is included in all three faults $f_1$, $f_2$, and $f_3$. According to an example, an EDGERANK algorithm may be used to select the key metrics and events (i.e., metrics and events critical to a fault to form a fault pattern) based, for example, on three factors, such as, affinity, weight, and time decay, as shown in FIG. 7. Referring to FIG. 7, the affinity value $U_e$ may be calculated as the percentage of an event occurrence with a particular fault. The affinity value $U_e$ may be high when an event shows up on the path of a fault. The weight value $W_e$ may be calculated as the reciprocal of the number of paths a metric or event is on. In the example of FIG. 6, weight($e_2$)=⅓, as event $e_2$ shows up on three paths. The discriminative power of a metric or event may diminish as a direct correspondence to a number of paths the metric or event shows up on. For example, the more paths a metric or event shows up on, the less discriminative power the metric or event has. The time decay $D_e$ may represent an exponential function of the time associated with a metric or event.

The rank of a metric or an event may be determined as follows:

$$\text{Rank}(e) = \Sigma U_e \times W_e \times D_e \quad \text{Equation (5)}$$

For Equation (5), e may represent the link from a metric or an event to a fault. Metrics or events with the highest rank may be selected first compared to lower ranked metrics or events. For example, referring to FIG. 6, the rank information of each of the metrics and events is shown. For example, event $e_1$ may include a rank of 0.6, event $e_2$ may include a rank of 0.5, metric $m_2$ may include a rank of 0.1, etc. The higher the rank value is, the more relative the metric or event is to an associated fault. For example, referring to FIG. 6, event $e_6$ may be critical for detecting the fault $f_1$ as it is associated with a high rank value (i.e., 0.7), while metric $m_2$ may be disregarded for identifying fault $f_1$ as its rank value is low (0.1). Metrics and events may be added to the fault pattern until there is no further information gain. If events or metrics belong to the same cluster from the substitution graph, only one of them (e.g., an event or a metric) may be chosen. For each metric, instead of an absolute value, a tolerance range may be recorded to accommodate the variation due to dynamics in workloads. According to an example, only the identified key metrics and events may be closely monitored to thereby reduce fault diagnosis overhead.

With continued reference to FIG. 1, the fault diagnosis module 102 may diagnose faults in the enterprise system 103 by monitoring the enterprise system 103 for metrics and events, checking the occurrence of a metric and/or an event against the substitution graph 109, and traversing an appropriate fault path along the detection graph 112 to diagnose the occurrence of a fault. The fault diagnosis module 102 may provide for the diagnosis of faults, and further provide the ability to adapt to a changing enterprise environment, such as a cloud environment.

The fault diagnosis module 102 may monitor all the available metrics and events from the enterprise system 103. The fault diagnosis module 102 may place a higher emphasis on the monitoring of metrics and events that are from known fault patterns. For example, the fault diagnosis module 102 may check for metrics and events from known fault patterns at a higher monitoring frequency compared to other general metrics and events to reduce monitoring overhead. For the aforementioned thresholds set for key metrics in a private data center (e.g., the training enterprise system 104), since there may be other applications competing for resources, thus causing unpredictable interference in a public cloud environment (e.g., the enterprise system 103), the aforementioned thresholds set for key metrics in the private data center may no longer apply. In order to achieve adaptability, metric values (e.g., CPU usage) may be measured for a public cloud environment and compared with the values from a private data center with similar workload intensity. Such ratios (i.e., (metric value in a private data center with similar workload intensity as a public cloud environment)/(metric value recorded for the private data center)) may be used to adjust the threshold of metrics that are included in recorded fault patterns for applicability to a public cloud environment. For example, a threshold related to a fault pattern based on a ratio of applicability of the training enterprise system 104 to the enterprise system 103 may be adjusted.

For each pattern that has been identified previously, if an element (i.e., a metric or an event) e has been matched, then all the metrics and events that belong to the same cluster of the detected metric or event may be placed on alert. A match for a metric may be based on a value of the metric falling within a derivation range (e.g., CPU usage is 80%±5%). The range may be trained from constructing the substitution graph 109. Based on the strong correlation, any abnormal activity to a metric or an event in a cluster may indicate a fault with a high probability. Therefore, the fault diagnosis module 102 may check all related metrics and events at each sampling round (i.e., each monitoring instance). The fault diagnosis module 102 may proceed by expanding paths starting from element e.

The fault diagnosis module 102 may traverse the detection graph 112 in a breadth-first order. The path expansion may end if one of the following three criteria is met. First, the path expansion may end if the path cannot be expanded, and in this case, no fault may be reported. Secondly, the path expansion may end if the path grows but there are no other metrics or events matched with known fault patterns (i.e., if no additional metrics or events on a fault path match with known fault patterns), and in this case, no fault may be identified. Thirdly, the path expansion may end if the path matches a fault pattern. Once the path expansion from element e has terminated, all the metrics and events that are placed in an alert status may be set back to a normal status. Therefore, such metrics and events that are set back to a normal status may no longer need to be monitored at a higher monitoring frequency.

The Bayesian inference may be used to estimate the probability on whether a current path may lead to a known fault. A node $N_i$ in the Bayesian network may represent a key metric or event selected in a detected fault pattern. A link $L_{i,j}$ connecting two nodes $N_i$ and $N_j$ may represent the correlation between those two metrics or events. Such information may be obtained from the pair-wise similarity matrix described above with reference to FIG. 4. Given the topology of a Bayesian network and the probability distribution values at some of the nodes, the probability distribution values of other nodes may be deducted. This may be referred to as inference in a Bayesian network. For the fault diagnosis module 102, $P(path_i, G_s, G_d)$ may be used to represent the probability of a path; triggering a fault given the information from substitution graph $G_s$ (i.e., the substitution graph 109) and detection graph $G_d$ (i.e., the detection graph 112). A likelihood weighting process may be applied to estimate the value of $P(path_i, G_s, G_d)$, which may be inferred as follows:

$$\begin{aligned} P(path_i, G_s, G_d) &= P(f_k \mid N_1, N_2, \ldots, N_m, L_{1,2}, L_{2,3}, \ldots, L_{s,t}), \\ &= P(N_1 \mid N_2, \ldots, N_m, L_{1,2}, L_{2,3}, \ldots, L_{s,t}) \times \\ &\quad P(N_1 \mid L_{1,2}, \ldots, L_{s,t}) \times \ldots \times P_c(N_1, N_2) \times \\ &\quad P(L_{1,2} \mid L_{2,3}, \ldots, L_{s,t}) \times \ldots \times P(f_k \mid N_m) \end{aligned}$$

Equation (6)

For Equation (6), $P_c(N_i, N_j)$ may refer to the consistency score assigned to the cluster where node $N_i$ and $N_j$ belong. Further, $P(f_k|N_m)$ may represent the rank calculated from the detection graph 112. A path with $P(path_i, G_s, G_d)$ over a threshold may be claimed as a fault. Since it is not required to match each element in the fault pattern as long as the detected elements on the path are discriminative enough to identify a fault, this may accelerate fault detection by the fault diagnosis module 102.

If a fault is unknown to the adaptive fault diagnosis system 100, the fault diagnosis module 102 may expedite reporting of such faults to an administrator. For example, as discussed above, key metrics and events may be ranked based on their impact on detecting a particular fault. Even if a fault pattern cannot be matched, the key metric and/or event with the highest rank with respect to individual faults may have been detected. In this case, it may be likely that an unknown fault may be triggered. The probability of detecting an unknown fault may be defined as follows:

$$P(f_u|N_1, N_2, \ldots, N_m) = P(f_k|N_1) \times \ldots \times P(f_k|N_m) \times P_c(N_1, N_2) \times \ldots \times P_c(N_1, N_m)$$

Equation (7)

Based on Equation (7), an alert for a potential fault may be raised if $P(f_u|N_1, N_2, \ldots, N_m)$ is higher than a threshold. If an unknown fault occurs before it can be reported, the pattern of the unknown fault may be learned, and both the substitution graph 109 and the detection graph 112 may be updated at 110 accordingly.

Referring to FIGS. 1 and 8, FIG. 8 illustrates a fault detection process 150, according to an example of the present disclosure. For the fault detection process 150, the fault detection may include the substitution graph ($G_s$) 109, the detection graph ($G_d$) 112, and detected fault patterns as inputs to the fault diagnosis module 102. At 151, the fault diagnosis module 102 may monitor events and metrics from detected fault patterns for the enterprise system 103. At 152, if the enterprise system 103 (i.e., the new environment) is different than the training enterprise system 104, any thresholds related to recorded fault patterns may be adjusted based on ratios for applicability to the enterprise system 103 (i.e., the new environment). At 153, for each element e that is matched, at 154, associated clusters of the substitution graph 109 may be placed on alert. At 155, the fault diagnosis module 102 may also locate paths starting from the element e in the detection graph 112 and traverse the located path. At 156, the fault diagnosis module 102 may calculate confidence (i.e., probability of a path; triggering a fault as discussed above with respect to Equation (6)) of a current path, and if the confidence is greater than a predetermined threshold, the fault diagnosis module 102 may generate an alert indicating a fault is likely to occur. At 157, if a new fault occurs, but does not exist in the list of detected fault patterns, the fault diagnosis module 102 may update the substitution graph 109 and the detection graph 112. Further, the fault diagnosis module 102 may add the new fault to the list of detected fault patterns.

Figure 9:
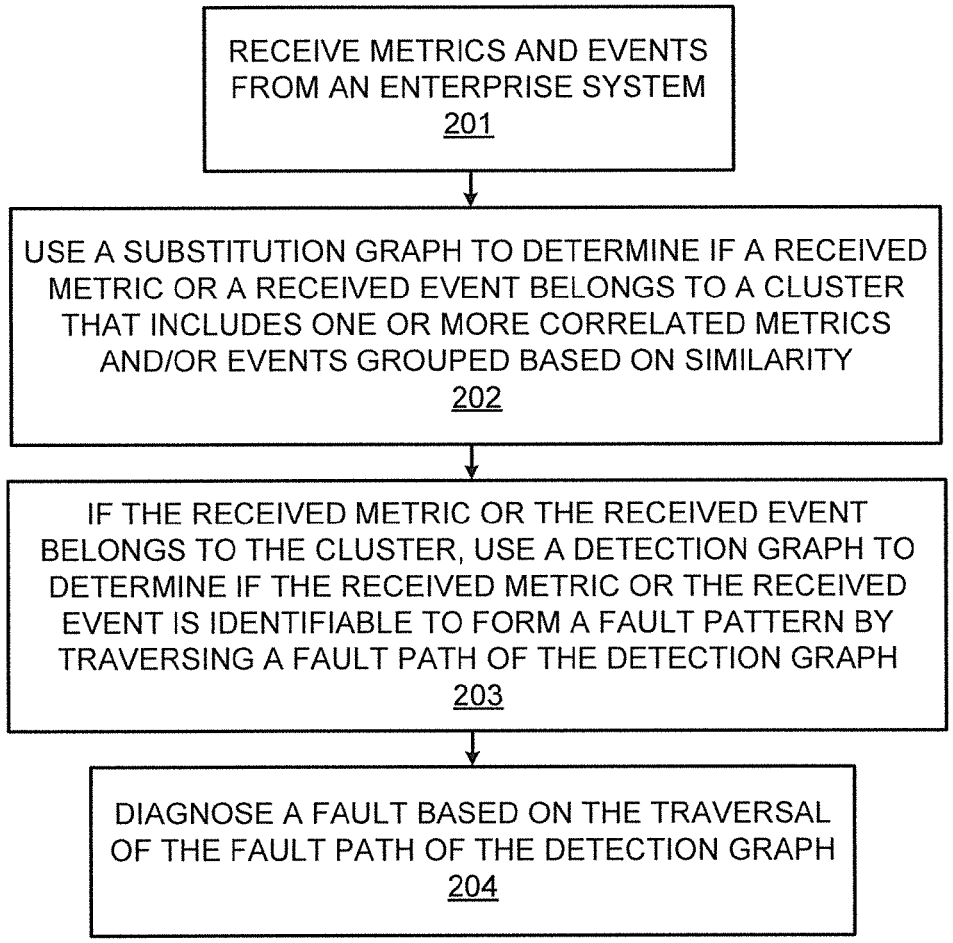
FIG. 9 illustrates a method for adaptive fault diagnosis, according to an example of the present disclosure.
Figure 10:
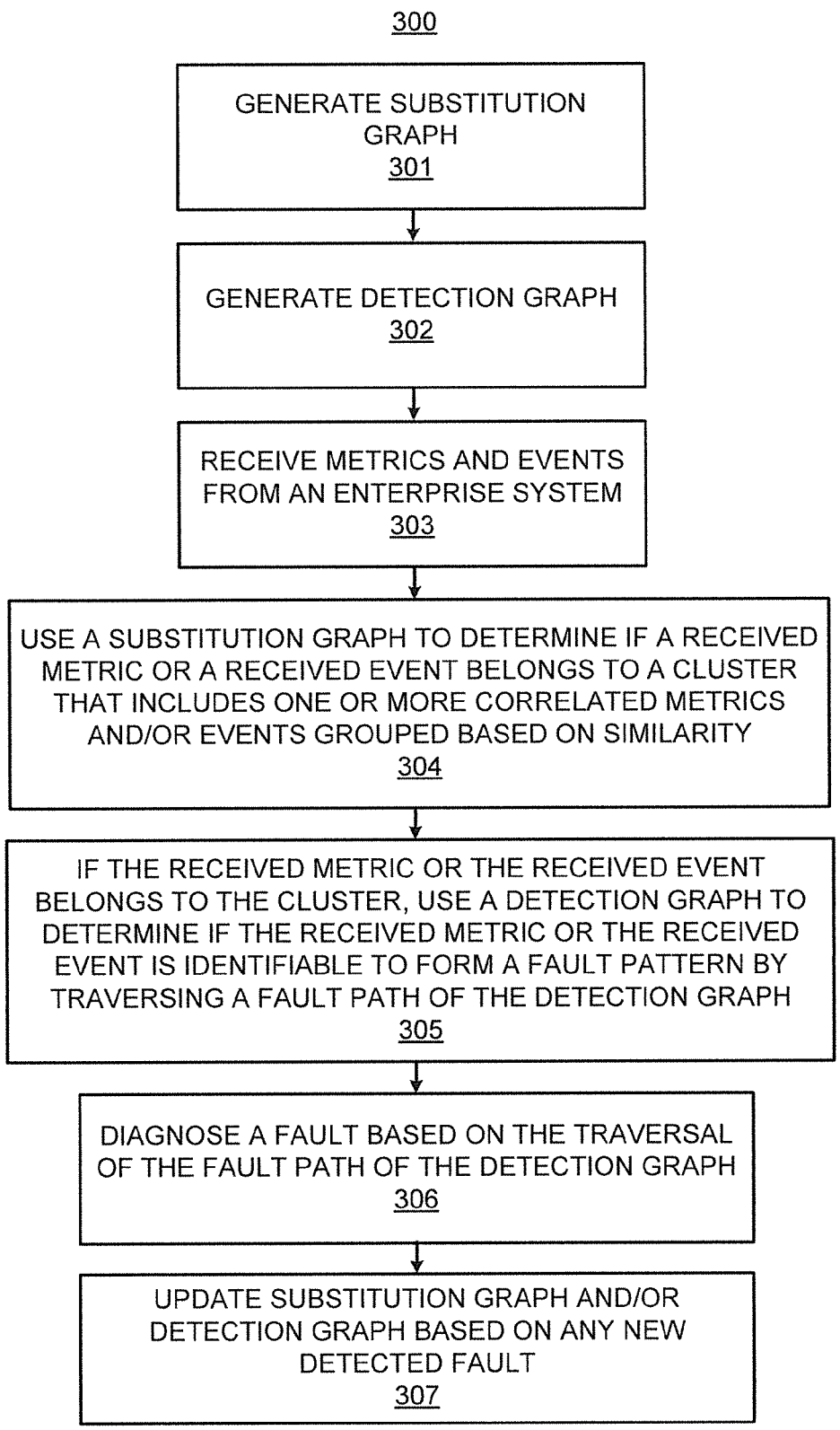
FIG. 10 illustrates further details of the method for adaptive fault diagnosis, according to an example of the present disclosure.

FIGS. 9 and 10 respectively illustrate flowcharts of methods 200 and 300 for adaptive fault diagnosis, according to examples. The methods 200 and 300 may be implemented on the adaptive fault diagnosis system 100 described above with reference to FIGS. 1-8 by way of example and not limitation. The methods 200 and 300 may be practiced in other systems.

Referring to FIG. 9, at block 201, metrics and events from an enterprise system may be received. For example, referring to FIG. 1, metrics and events from the enterprise system 103 may be received by the fault diagnosis module 102.

At block 202, a substitution graph may be used to determine if a received metric or a received event belongs to a cluster that includes one or more correlated metrics and/or events grouped based on similarity. For example, referring to FIG. 1, the substitution graph 109 may be used by the fault diagnosis module 102 to determine if a received metric or a received event belongs to a cluster that includes one or more correlated metrics and/or events grouped based on similarity.

At block 203, if the received metric or the received event belongs to the cluster, a detection graph may be used to determine if the received metric or the received event is identifiable to form a fault pattern by traversing a fault path of the detection graph. For example, referring to FIG. 1, if the received metric or the received event belongs to the cluster, the detection graph 112 may be used to determine if the received metric or the received event is identifiable to form a fault pattern by traversing a fault path of the detection graph 112.

At block 204, a fault may be diagnosed based on the traversal of the fault path of the detection graph. For example, referring to FIG. 1, a fault may be diagnosed by the fault diagnosis module 102 based on the traversal of the fault path of the detection graph 112.

Referring to FIG. 10, at block 301, a substitution graph may be generated by collecting metrics and events created by injection of a plurality of labeled faults in a training enterprise system, and using the collected metrics and events to generate the substitution graph to group one or more collected metrics and/or one or more collected events into a plurality of clusters such that the one or more collected metrics and/or events grouped in one cluster are more strongly related to the one or more collected metrics and/or events grouped in the one cluster as compared to the one or more collected metrics and/or events in other clusters. Each cluster may be scored based on how the one or more collected metrics and/or events in the scored cluster originated. For example, referring to FIG. 1, the substitution graph generation module 108 may generate the substitution graph 109.

At block 302, a detection graph may be generated by using the collected metrics and events to generate the detection graph by ordering and connecting one or more collected metrics and/or events based on respective timestamps, ranking the one or more collected metrics and/or events based on contribution to fault identification, and selecting the one or more ranked metrics and/or events critical to a fault to form a fault pattern. For example, referring to FIG. 1, the detection graph generation module 111 may generate the detection graph 112.

At block 303, metrics and events from an enterprise system may be received. For example, referring to FIG. 1, metrics and events from the enterprise system 103 may be received by the fault diagnosis module 102.

At block 304, a substitution graph may be used to determine if a received metric or a received event belongs to a cluster that includes one or more correlated metrics and/or events grouped based on similarity. For example, referring to FIG. 1, the substitution graph 109 may be used by the fault diagnosis module 102 to determine if a received metric or a received event belongs to a cluster that includes one or more correlated metrics and/or events grouped based on similarity.

At block 305, if the received metric or the received event belongs to the cluster, a detection graph may be used to determine if the received metric or the received event is identifiable to form a fault pattern by traversing a fault path of the detection graph. For example, referring to FIG. 1, if the received metric or the received event belongs to the cluster, the detection graph 112 may be used to determine if the received metric or the received event is identifiable to form a fault pattern by traversing a fault path of the detection graph 112.

At block 306, a fault may be diagnosed based on the traversal of the fault path of the detection graph. For example, referring to FIG. 1, a fault may be diagnosed by the fault diagnosis module 102 based on the traversal of the fault path of the detection graph 112.

At block 307, the substitution graph and/or the detection graph may be updated based on any new detected fault. For example, referring to FIG. 1, the fault diagnosis module 102 may update at 110 the substitution graph 109 and/or the detection graph 112 based on any new detected fault.

Figure 11:
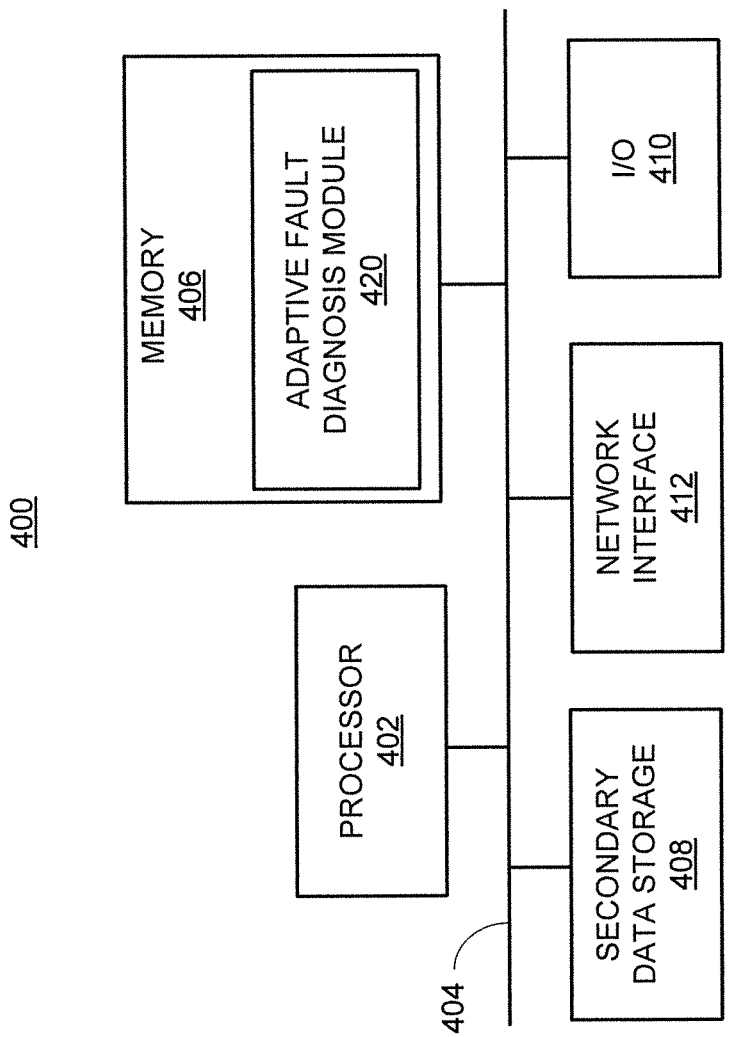
FIG. 11 illustrates a computer system, according to an example of the present disclosure.

FIG. 11 shows a computer system 400 that may be used with the examples described herein. The computer system 400 represents a generic platform that includes components that may be in a server or another computer system. The computer system 400 may be used as a platform for the system 100. The computer system 400 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 includes a processor 402 that may implement or execute machine readable instructions performing some or all of the methods, functions and other processes described herein. Commands and data from the processor 402 are communicated over a communication bus 404. The computer system 400 also includes a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums. The memory 406 may include an adaptive fault diagnosis module 420 including machine readable instructions residing in the memory 406 during runtime and executed by the processor 402. The module 420 may include the modules of the system 100 described with reference to FIGS. 1-8.

The computer system 400 may include an I/O device 410, such as a keyboard, a mouse, a display, etc. The computer system 400 may include a network interface 412 for connecting to a network. Other known electronic components may be added or substituted in the computer system 400.

What has been described and illustrated herein are examples along with some of their variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. An adaptive fault diagnosis system comprising:
a memory storing machine readable instructions to:
receive metrics and events from an enterprise system;
use a substitution graph to determine if a received metric or a received event belongs to a cluster that includes at least one of one or more correlated metrics and events grouped based on similarity;
if the received metric or the received event belongs to the cluster, use a detection graph to determine if the received metric or the received event is identifiable to form a fault pattern by traversing a fault path of the detection graph; and
diagnose a fault based on the traversal of the fault path of the detection graph; and
a processor to implement the machine readable instructions.

2. The adaptive fault diagnosis system of claim 1, further comprising machine readable instructions to:
generate the substitution graph by:
collecting metrics and events created by injection of a plurality of labeled faults in a training enterprise system;
using the collected metrics and events to generate the substitution graph to group at least one of one or more collected metrics and one or more collected events into a plurality of clusters such that at least one of the one or more collected metrics and events grouped in one cluster are more strongly related to at least one of the one or more collected metrics and events grouped in the one cluster as compared to at least one of the one or more collected metrics and events in other clusters; and
scoring each cluster based on how at least one of the one or more collected metrics and events in the scored cluster originated.

3. The adaptive fault diagnosis system of claim 1, further comprising machine readable instructions to:
generate the detection graph by:
collecting metrics and events created by injection of a plurality of labeled faults in a training enterprise system; and
using the collected metrics and events to generate the detection graph by:
ordering and connecting at least one of one or more collected metrics and events based on respective timestamps.

4. The adaptive fault diagnosis system of claim 3, wherein using the collected metrics and events to generate the detection graph further comprises machine readable instructions to:
select at least one of one or more collected metrics and events critical to a fault to form a fault pattern by using an EDGERANK process.

5. The adaptive fault diagnosis system of claim 3, wherein using the collected metrics and events to generate the detection graph further comprises machine readable instructions to:
select at least one of one or more collected metrics and events critical to a fault to form a fault pattern based on affinity, weight, and time decay related to at least one of the one or more collected metrics and events.

6. The adaptive fault diagnosis system of claim 3, wherein using the collected metrics and events to generate the detection graph further comprises machine readable instructions to:
rank at least one of the one or more collected metrics and events based on contribution to fault identification; and
select at least one of one or more ranked metrics and events critical to a fault to form a fault pattern.

7. The adaptive fault diagnosis system of claim 1, further comprising machine readable instructions to:
monitor a subset of the received metrics and events from the enterprise system based on previously detected fault patterns.

8. The adaptive fault diagnosis system of claim 1, further comprising machine readable instructions to:
update at least one of the substitution graph and the detection graph based on a new detected fault.

9. The adaptive fault diagnosis system of claim 1, further comprising machine readable instructions to:
utilize the fault pattern as a template to diagnose a new fault that includes at least one of different events and different metrics compared to at least one of the events and metrics of the fault pattern.

10. The adaptive fault diagnosis system of claim 1, wherein the substitution graph includes a metric A correlated to a metric B if the metric A is a function of the metric B.

11. The adaptive fault diagnosis system of claim 1, wherein the substitution graph includes an event A correlated to an event B if the event A and the event B always appear simultaneously or with a fixed order.

12. The adaptive fault diagnosis system of claim 1, wherein the substitution graph includes an event A correlated to a metric B if the event A occurs after the metric B reaches a threshold, or if the event A includes the metric B.

13. The adaptive fault diagnosis system of claim 1, wherein diagnosing the fault based on the traversal of the fault path of the detection graph further comprises machine readable instructions to:

determine if the fault path cannot be expanded, and diagnosing no fault;

determine if no additional metrics or events on the fault path match with known fault patterns, and diagnosing no fault; and determine if traversal of the fault path matches a fault pattern, and diagnosing a fault.

14. The adaptive fault diagnosis system of claim 1, wherein diagnosing the fault based on the traversal of the fault path of the detection graph further comprises machine readable instructions to:

estimate a probability to determine if the fault path leads to a known fault.

15. The adaptive fault diagnosis system of claim 1, wherein diagnosing the fault further comprises machine readable instructions to:

determine a probability of detecting an unknown fault.

16. The adaptive fault diagnosis system of claim 1, further comprising machine readable instructions to:

adjust a threshold related to the fault pattern based on a ratio of applicability of a training enterprise system to the enterprise system.

17. The adaptive fault diagnosis system of claim 1, wherein the enterprise system is a cloud-based enterprise system.

18. A method for adaptive fault diagnosis, the method comprising:

receiving metrics and events from an enterprise system;

using a substitution graph to determine if a received metric or a received event belongs to a cluster that includes at least one of one or more correlated metrics and events grouped based on similarity;

if the received metric or the received event belongs to the cluster, using a detection graph to determine if the received metric or the received event is identifiable to form a fault pattern by traversing a fault path of the detection graph; and diagnosing, by a processor, a fault based on the traversal of the fault path of the detection graph.

19. The method of claim 18, further comprising:
generating the substitution graph and the detection graph by:

collecting metrics and events created by injection of a plurality of labeled faults in a training enterprise system;

using the collected metrics and events to generate the substitution graph to group at least one of one or more collected metrics and one or more collected events into a plurality of clusters such that at least one of the one or more collected metrics and events grouped in one cluster are more strongly related to at least one of the one or more collected metrics and events grouped in the one cluster as compared to at least one of the one or more collected metrics and events in other clusters; and using the collected metrics and events to generate the detection graph by ordering and connecting at least one of the one or more collected metrics and events based on respective timestamps.

20. A non-transitory computer readable medium having stored thereon a computer executable program to provide adaptive fault diagnosis, the computer executable program when executed causes a computer system to:

receive metrics and events from an enterprise system;

use a substitution graph to determine if a received metric or a received event belongs to a cluster that includes at least one of one or more correlated metrics and events grouped based on similarity;

if the received metric or the received event belongs to the cluster, use a detection graph to determine if the received metric or the received event is identifiable to form a fault pattern by traversing a fault path of the detection graph; and diagnose, by a processor, a fault based on the traversal of the fault path of the detection graph.

* * * * *